INVENTOR
RONALD DICKSON
ERIC SWAINSON

Sept. 8, 1959 R. DICKSON ET AL 2,903,495
ARC MELTING FURNACE AND METHOD OF MELTING HIGH
MELTING POINT METALLIC MATERIAL
Filed Aug. 17, 1956 2 Sheets-Sheet 2

INVENTORS
RONALD DICKSON
ERIC SWAINSON

BY Cushman, Darby & Cushman
ATTORNEYS

United States Patent Office 2,903,495
Patented Sept. 8, 1959

2,903,495

ARC MELTING FURNACE AND METHOD OF MELTING HIGH MELTING POINT METALLIC MATERIAL

Ronald Dickson, Bridgnorth, and Eric Swainson, Birmingham, England, assignors to Imperial Chemical Industries, Limited, Millbank, London, England, a corporation of Great Britain Application August 17, 1956, Serial No. 604,851

6 Claims. (Cl. 13—32)

This invention relates to improvements in arc melting furnaces particularly those employed for melting metals and alloys which have high melting points and are reactive, such as titanium, zirconium and tantalum.

In arc melting furnaces for such metals the metal is continuously fed into and melted in a water cooled metal crucible which is sealed by a cover through which pass one or more electrodes whereby an arc or arcs are struck between the metal in the crucible and the electrode tips. Such electrodes may be either of a non-consumable cooled type, in which case a separate feed for raw material is provided, or of a consumable type which combines the functions of electrode and raw material feed. Contamination of the molten titanium by oxygen and nitrogen in the air must be avoided and consequently the crucible is either evacuated or filled with an inert gas.

As at present constructed a crucible for an arc melting furnace of the kind referred to, comprises a hollow metallic cylinder, closed at one end, and surrounded by a water jacket. In arc-melting processes generally there is a possibility of direct arcing from the electrode to the crucible wall. In the case of water-cooled crucibles, direct arcing to the walls may hole them and result in water coming into contact with the hot metal and with the electrodes thereby suddenly liberating hydrogen and large volumes of steam. Apart from the danger of explosion from a large leak the presence of a small leak cannot always be readily detected and may result in contamination of the metal.

The present trend in melting practice is towards the employment of consumable electrodes and increased power inputs and both these factors increase the explosion hazard. The erection of blast walls, as a safety measure, around the furnaces, which would then be operated by remote control, is expensive and troublesome.

The object of this invention is to provide a crucible in which these risks are reduced.

According to the invention, we provide a method of arc melting high melting point metals and alloys in which a safety space bridged by metallic conducting members is provided between the wall of the vessel holding the molten metal and the cooled outer wall.

Also according to the invention, we provide a metal crucible for an arc melting furnace of the kind described, comprising a vessel coaxially disposed within an outer shell and with an annular space therebetween, the said space being either evacuated or filled with an inert gas, and being bridged by metallic members adapted to conduct heat from the inner vessel to the outer shell. Preferably the outer wall of the crucible is cooled for example by enclosure within a water jacket and by the provision of cooling fins or the like on the said outer wall which fins extend into the water space.

In the present method, before melting begins, the safety space is either evacuated or filled with an inert gas. Charging of the furnace and melting then commence and normal practice is then followed. Expansion of gas in the safety space due to the heating of the furnace will cause a rise in pressure, and allowance should be made for this fact, particularly if a pressure-operated warning system is incorporated. Such a system may, for example, be arranged to operate if the pressure in the safety space becomes approximately equal to that in the inner vessel holding the charge, such as may happen if the wall of the inner vessel is perforated. The vessel and the safety space may, therefore, be maintained during operation at different pressures. If no pressure-operated warning system is employed, the pressure of the atmosphere in the safety space is not very important. Whether the safety space is evacuated or filled with an inert gas at or above or below atmospheric pressure depends upon the conditions of operating the furnace, and whether it is desired to detect leaks as soon as they occur. Thus, for example, when a warning device is employed and melting is carried out in a vacuum, the safety space may be filled with argon at or near atmospheric pressure. A number of different arrangements are possible and the method is, therefore, adaptable to meet different conditions of furnace operation.

The whole crucible assembly is preferably made from a metal having a high thermal conductivity, such as copper, to ensure that heat is extracted at a sufficiently high rate to prevent damage to the crucible. The members should be securely attached to both the inner vessel and the outer shell in order to ensure good heat transfer.

The safety space is composed of a number of small compartments, each bounded by the bridging members and by the walls of the inner and outer compartments. It is necessary, in order to be able to remove the air from the space, that the small compartments shall be in spacial communication throughout the space, and provision for this may be made in the shape of the members employed. Where rings are used as bridging members, perforations or notches round the edges will suffice.

One embodiment of the invention is illustrated by way of example in the accompanying drawings of which:

Figures 1, 2:
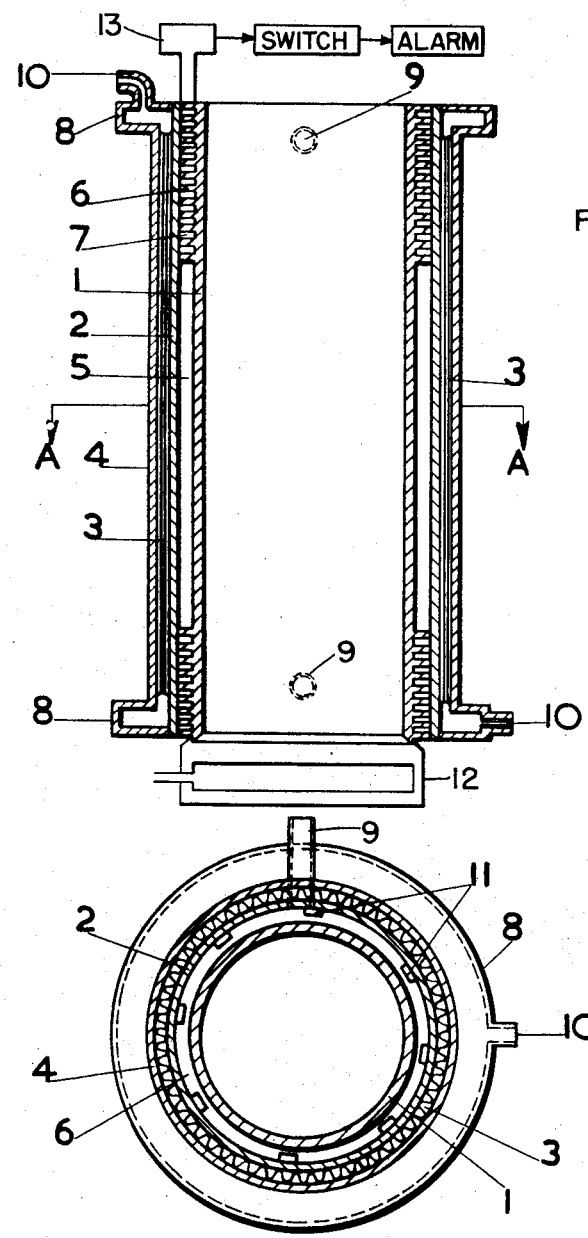
Figure 1 is a sectional view of the crucible constructed in accordance with the invention.
Figure 2 is a cross-sectional view of the crucible illustrated in Figure 1 along the line A—A.

Referring to the drawings, vessel 1 is co-axially located within the outer shell 2, an annulus 5, sealed at both ends, being formed therebetween. The lower end of vessel 1 is, in use, closed by means of a removable water cooled base 12. Throughout the said annulus a plurality of annular fin members 6, extending in side by side relationship and formed integrally with the walls of vessel 1, are secured to the inner surface of the outer shell 2. The spaces 7 enclosed by the fin members 6 and the walls 1 and 2, are interconnected by means of notches 11 in the outer edges of the said fin members. Inlet and outlet connections 9 are incorporated in the upper and lower parts of the outer shell 2 for purging the air from the annulus 5 and for the provision of an inert atmosphere therein. Only one such connection is required when the annulus 5 is to be evacuated. To the outer shell 2, and extending substantially its whole length, is attached a corrugated cooling element 3. A cylindrical water jacket 4 having annular flanges 8 and inlet and outlet connections 10 at both ends is attached to the outermost parts of the corrugated element 3.

In operation, the charge is melted within the inner vessel 1 and heat is conducted therefrom by way of the fin members 6, the outer shell 2, and the cooling element 3 to the water circulating in the jacket 4.

In the improved crucible should a leak develop, the resulting change of pressure which occurs within the annulus can be utilized to operate an automatic current-breaking device and/or an audible or visual warning signal. A pressure-operated switch 13 (see Fig. 1) controlling a circuit breaker through a relay may, for example, be used to cut off the supply to the furnace and to operate the signal. At the same time, the annulus forms a safety space to prevent water reaching the hot metal, therefore, contamination of the metal from this source is eliminated and the explosion hazard is removed.

Another advantage is that the double-wall design permits operation of the furnace at a higher crucible wall temperature, which leads to more efficient melting and to a greater yield of metal on dressing the ingot.

The invention is applicable with advantage not only to the production of ingots by a single melting process, but also to the double-melting technique in which ingots, produced by either cooled or consumable electrodes are re-melted as consumable electrodes in order to improve their homogeneity.

Figure 3:
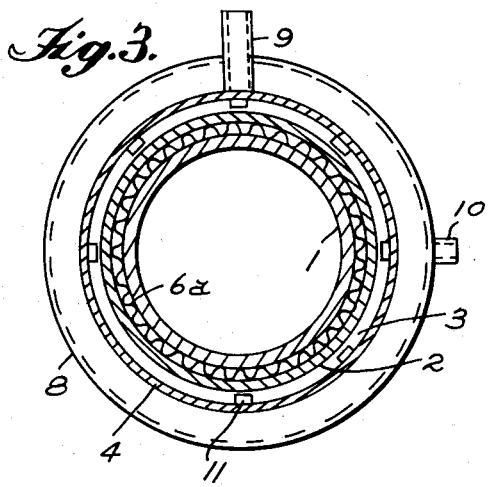
Figure 3 is a cross sectional view of a modification of the crucible illustrated in Fig. 1 taken along line A—A.
Figure 4:
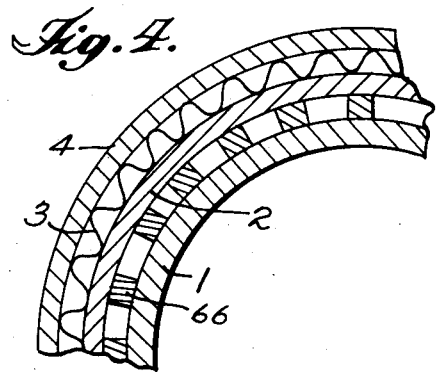
Figure 4 is a partial cross sectional view of another modification of the crucible taken along line A—A of Fig. 1.
Figure 5:
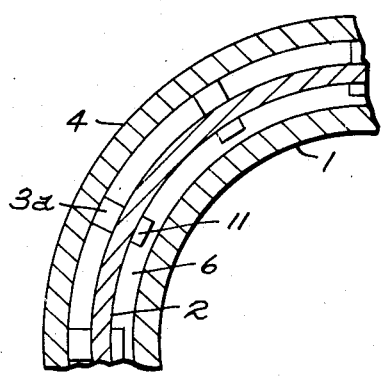
Figure 5 is a partial cross-sectional view of another modification of the crucible taken along line A—A of Fig. 1.
Figure 6:
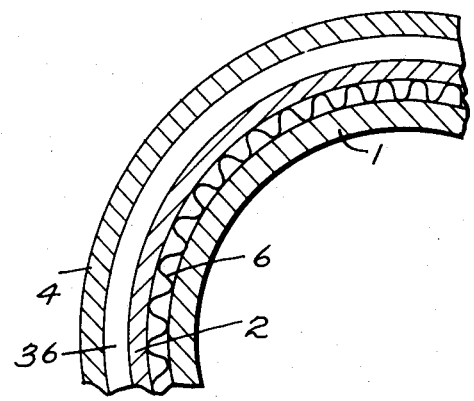
Figure 6 is a partial cross-sectional view of still another modification of the crucible taken along line A—A of Fig. 1.

In other embodiments of the invention, for example, the fin members 6 may comprise a corrugated element which extends longitudinally throughout the entire length of the annular space 5 as shown in Fig. 3 as 6a, or alternatively may comprise a plurality of equally spaced longitudinal fins as shown in Fig. 4 as 6b, these members whatever their form being joined to the walls of vessels 1 and outer shell 2. The external cooling fins 3 may also be formed either as longitudinal fins as shown in Fig. 5 as 3a or as a series of annular rings as shown in Fig. 6 as 3b.

The vessel 1 may be of any cross section suitable for ingot production.

We claim:

1. An arc-melting furnace comprising a melting vessel, a safety wall enclosing said melting vessel and spaced therefrom, the space between said vessel and said wall being sealed, a plurality of metallic elements extending in heat conducting relationship from said vessel to said wall through said sealed safety space, means for cooling the exterior of said wall, and means for sensing change of pressure in said sealed safety space to detect leakage through the melting vessel.

2. An arc-melting furnace as defined in claim 1, wherein said heat conducting metallic elements are fins integral with the melting vessel.

3. An arc-melting furnace as defined in claim 1, wherein the means for cooling the exterior of the safety wall is an enclosing water jacket.

4. An arc-melting furnace as defined in claim 1, wherein said means for sensing change of pressure is a pressure operated electrical switch operative to cut off power to the furnace and to actuate a signal.

5. A method of arc-melting high melting point metallic material comprising the steps of striking an arc between the metallic material and electrodes in a melting vessel, enclosing said vessel in a sealed safety space, conducting heat away from said vessel through said safety space cooling the outer wall of said safety space, and sensing change of pressure in said sealed safety space to detect leakage through the melting vessel.

6. A method as defined in claim 5, wherein said safety space is filled with inert gas at a pressure exceeding the pressure of the atmosphere in said vessel.

References Cited in the file of this patent

UNITED STATES PATENTS

| | | |
|---|---|---|
| 1,640,799 | Northrup | Aug. 30, 1927 |
| 2,640,860 | Herres | June 2, 1953 |
| 2,658,728 | Evans | Nov. 10, 1953 |
| 2,707,098 | Turpin | Apr. 26, 1955 |
| 2,727,936 | Boyer | Dec. 20, 1955 |
| 2,727,937 | Boyer | Dec. 20, 1955 |
| 2,730,083 | Kremser | Jan. 10, 1956 |
| 2,743,307 | Johnson | Apr. 24, 1956 |